UNITED STATES PATENT OFFICE.

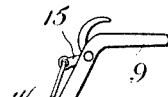
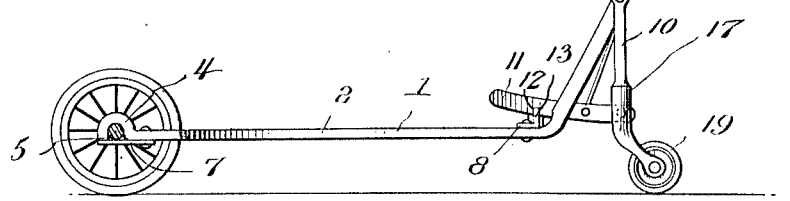
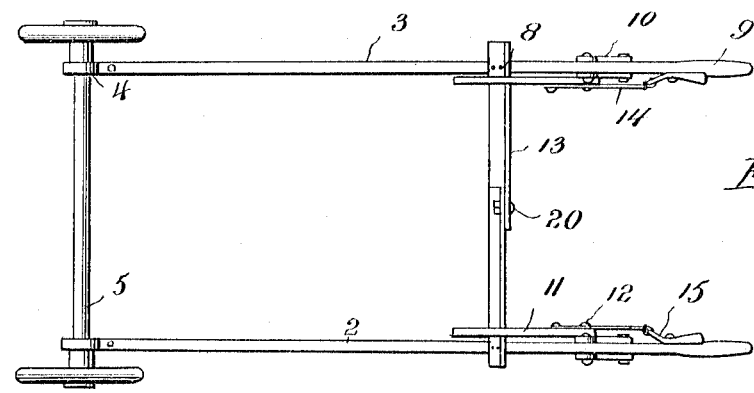
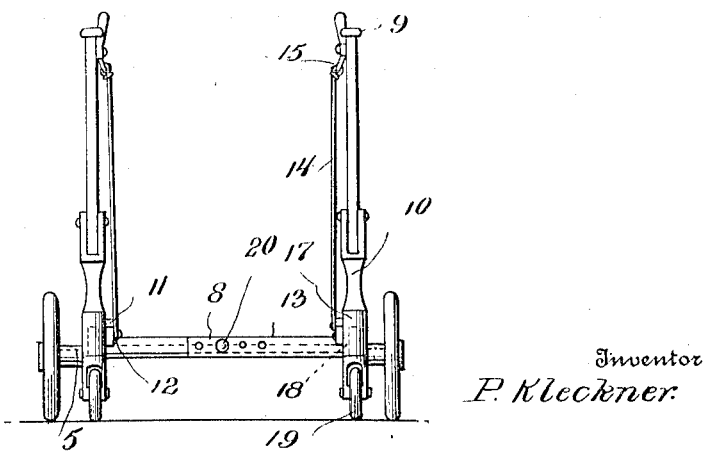

PHARES KLECKNER, OF FREEPORT, ILLINOIS.

ROCKING-CHAIR ATTACHMENT.

1,116,295.  Specification of Letters Patent.  Patented Nov. 3, 1914.

Application filed June 25, 1913. Serial No. 775,708.

*To all whom it may concern:*

Be it known that I, PHARES KLECKNER, a citizen of the United States, residing at Freeport, in the county of Stephenson and State of Illinois, have invented new and useful Improvements in Rocking-Chair Attachments, of which the following is a specification.

This invention relates to supports and conveyers for rocking chairs and the particular object of the invention is to provide a device of this character which may be adjusted to accommodate different size rockers and which may be conveniently and expeditiously placed beneath a rocker and the rocker elevated so that it may be transported from place to place while the invalid is undisturbed.

Further objects of the invention will appear as the following description is read in connection with the accompanying drawing which forms a part of this application, and in which:—

Figure 1 is a side elevation. Fig. 2 is a top plan view. Fig. 3 is a rear elevation.

Referring more particularly to the drawing, 1 represents a frame constructed of side bars 2 and 3 the terminals of which are formed into hooks 4 adapted to engage over the front axle 5. This axle is formed in two parts adjustably connected together, and has a pair of rubber tired wheels 6 freely journaled thereon. The hooks are held in removable engagement with the axle by means of the pivoted spring plates 7 pivoted to the side bars, as shown.

The side bars 2 and 3 of the frame are extended rearwardly of the cross bar 8 and thence upwardly and rearwardly in the form of handles 9 by which the rear end of the frame may be lifted. Pivoted to each handle member is a standard 10 which is locked in vertical position by a pivoted catch bar 11 notched, as shown at 12, to engage over the upstanding flange 13 on the cross bar 8. The catch bars are elevated through links 14 connected to bell crank levers 15 pivoted adjacent the upper ends of the handle. The lower ends of the standards are provided with sockets 17 to receive the pivoting pintles 18 of the caster wheels 19. The cross bar 8 of the frame is also formed in two parts both of which are apertured and adapted to receive the connecting bolts 20 by which the frame is adjusted as to width.

The device is applied to the rocker by disconnecting the hooks 4 from the axle and placing the axle under the front of the rockers of the chair. The frame is then lowered by raising the latch bars so as to permit the caster wheels to swing rearwardly. The cross bar 8 of the frame is then inserted beneath the rear of the rockers of the chair and the hooks 4 engaged with and locked upon the axle. The handles are then raised until the standards 11 swing to vertical position and the latching bar engages over the upstanding flange 13, at which time the device is in position for transporting the rocker to any desired point.

What is claimed is:—

1. A device of the class described comprising an axle having supporting wheels thereon, side bars removably engaged with the axle, a cross bar connecting the side bars, handles rising from the side bars, socketed standards pivoted to the handles and carrying caster wheels, and pawls carried by the standards engaged with the cross bar for locking the standards in operative position.

2. A device of the class described comprising an axle having supporting wheels thereon, side bars removably connected with the axle and having handle members extending upwardly and rearwardly from one end thereof, standards pivoted to move vertically on the handle members and carrying caster wheels, a cross bar connecting the side bars, independent pawls pivoted in the standards and notched to engage the cross bar, and means for independently operating the pawls whereby the standards may be permitted to swing rearwardly and the frame lowered.

3. A device of the class described comprising an adjustable axle carrying supporting wheels thereon, side bars removably connected to the axle, an adjustable cross bar connecting the side bars, handles rising from the side bars, standards pivoted to the handles and arranged to move vertically thereon, pawls pivotally mounted upon the standards and having notches to engage the cross bar for holding the standards in vertical position, and means carried by the handles and connected to the pawls for raising them out of engagement with the cross bar whereby the standards may swing rearwardly and permit the frame to be lowered.

In testimony whereof I affix my signature in presence of two witnesses.

PHARES KLECKNER.

Witnesses:
MAUDE WILSON,
S. R. NEIDIGH.

Copies of this patent may be obtained for five cents each, by addressing the "Commissioner of Patents, Washington, D. C."